United States Patent Office 3,758,354
Patented Sept. 11, 1973

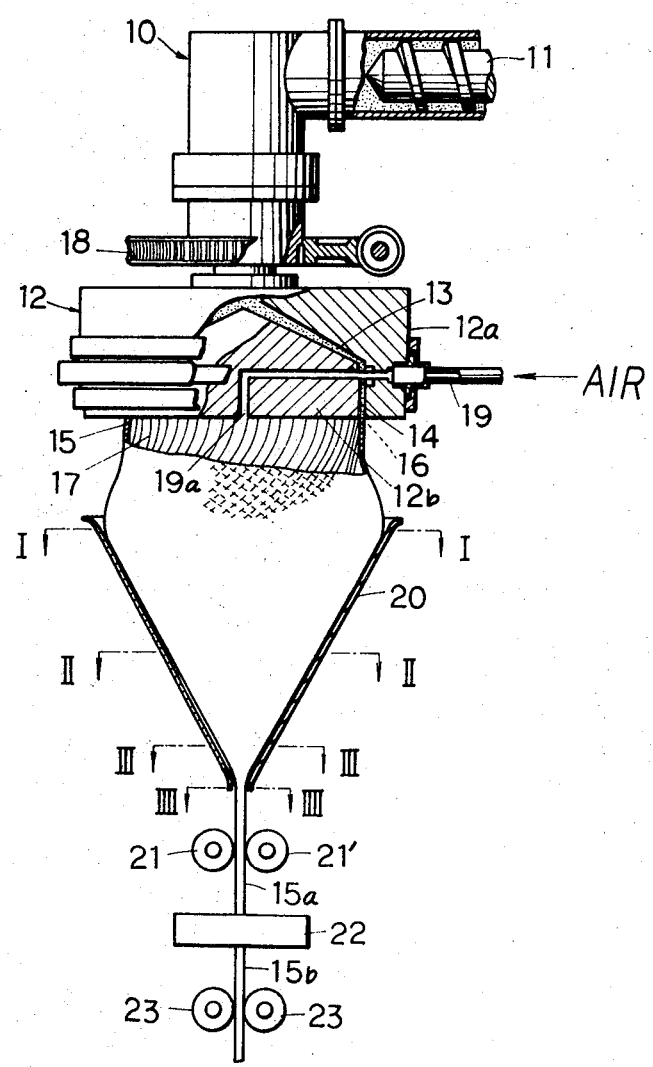

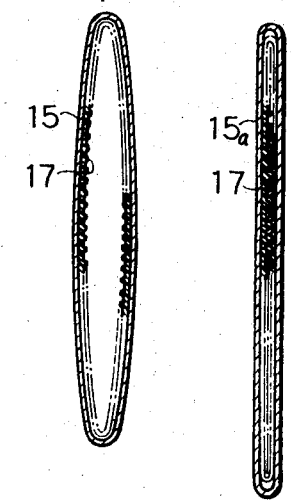
Fig. 2(III)   Fig. 2(IV)

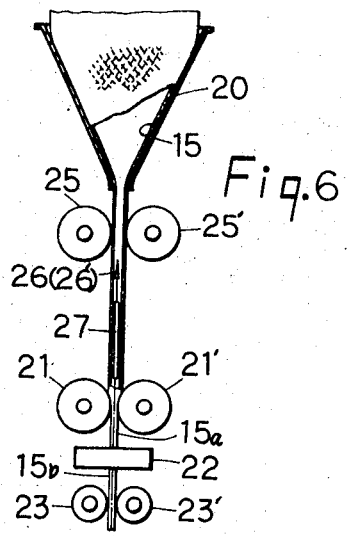
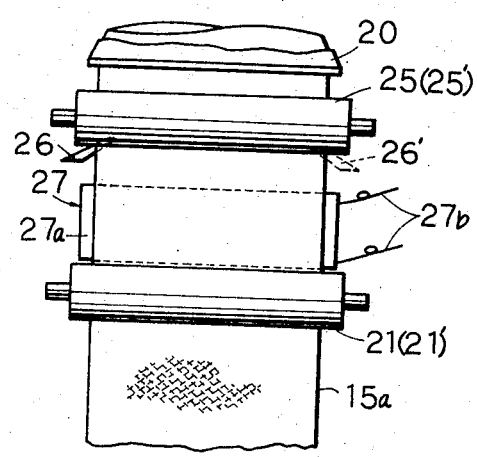
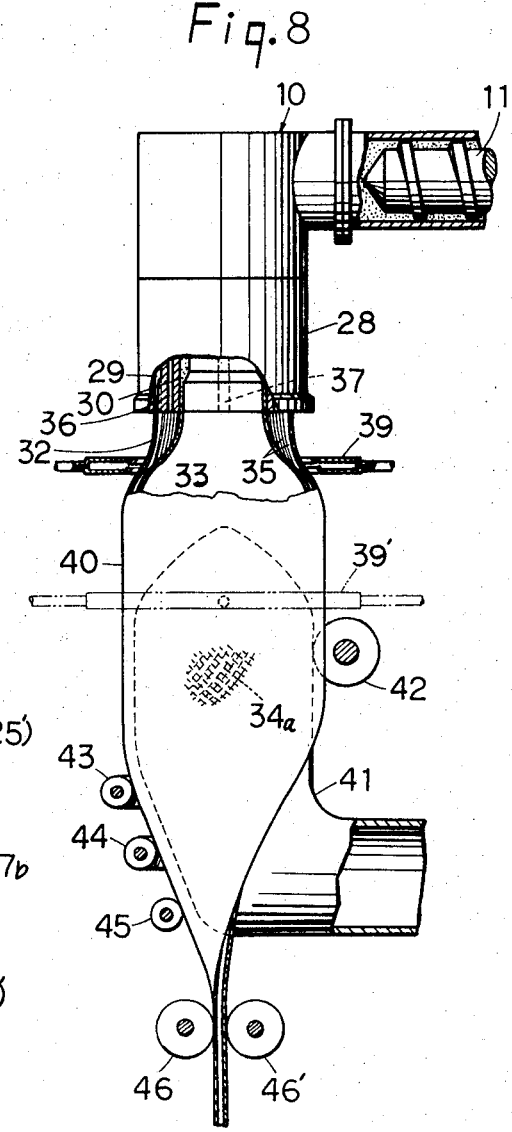

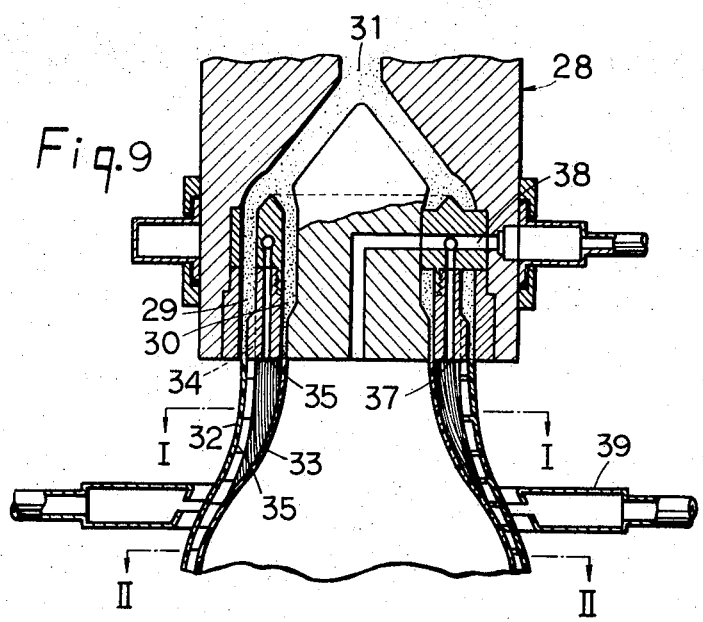
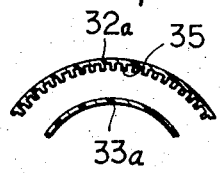 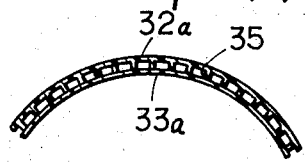
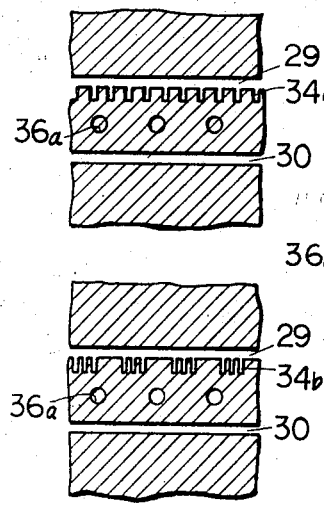 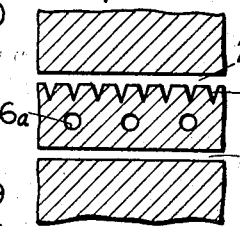 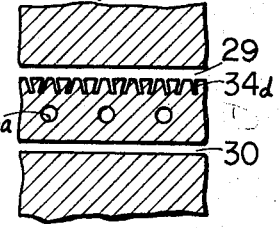

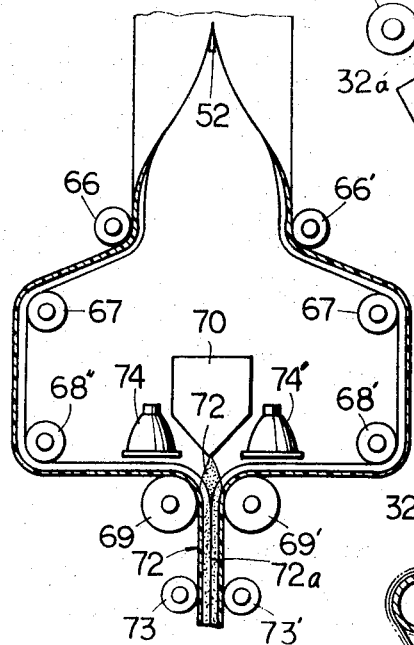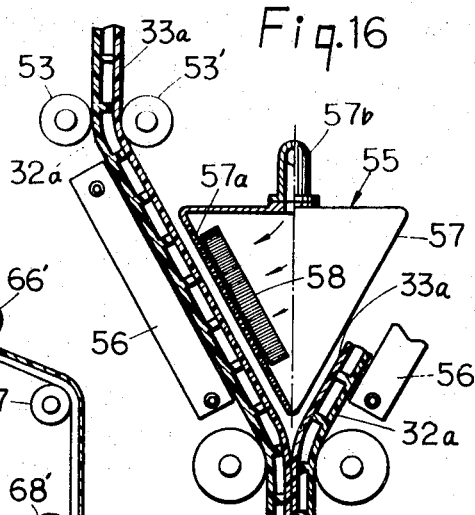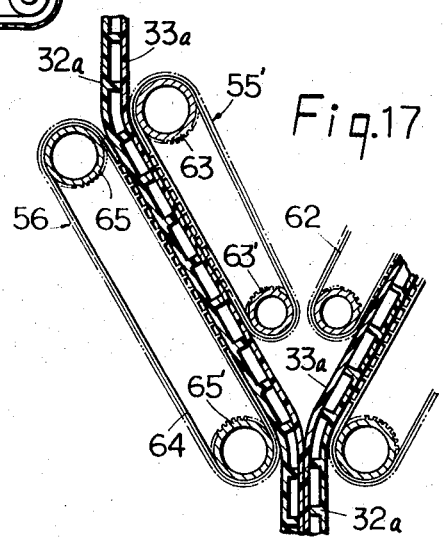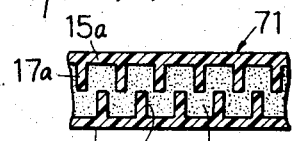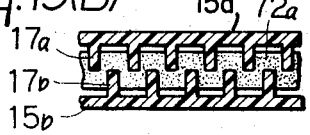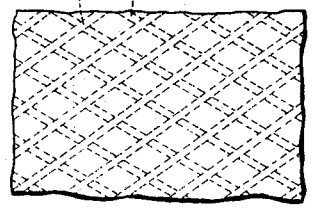

3,758,354
MANUFACTURE OF MULTI-PLY BOARD OF THERMOPLASTIC MATERIAL
Masao Sakurai, Yokohama, and Kikuo Muto, Kawasaki, Japan, assignors to Gunze Kobunshi Kogyo Kabushiki Kaisha, Kanagawa, Japan
Filed Oct. 15, 1970, Ser. No. 80,935
Claims priority, application Japan, Oct. 18, 1969, 44/83,064; Oct. 22, 1969, 44/84,064; Dec. 18, 1969, 44/101,311; Jan. 29, 1970, 45/7,455; Feb. 2, 1970, 45/8,569; May 8, 1970, 45/38,900
Int. Cl. B29d 9/00; B32b 5/18, 31/02
U.S. Cl. 156—79                               5 Claims

ABSTRACT OF THE DISCLOSURE

A method of manufacturing a multi-ply board of thermoplastic material, the board being highly resistant to bending stresses in different directions, the method including extruding one or two continuous tubing or tubings, forming spaced, linear projections or ribs on the inner surface of the tubing or tubings, expanding the tubing or tubings to a predetermined outside diameter through introduction thereinto of compressed air whereby, if two tubings are extruded, the two tubings are adhered to each other to form an integral tubing, twisting the tubing or tubings so that the linear projections are deviated sidewardly from the longitudinal direction, and forming the thus expanded tubing into a flat sheet which has at least one intermediate layer of spaced projections which are sandwiched by two external layers. The last step of forming the flat sheet may include the steps of deforming the expanded tubing progresively into a substantially flat sheet and cooling and setting the resultant sheet or the steps of cutting the expanded tubing in the longitudinal direction so that the tubing is opened into the form of a sheet and pressing the facing sides of the opened sheet upon each other to form a sheet which has at least one intermediate layer of spaced partition walls which are sandwiched by external layers. If desired, in the latter instance, a sheet of foaming material may be interposed between the external layers. The above mentioned projections to be finally formed on the inner surface of the tubing or tubings may be either linear or meandering ones depending upon the mode of rotating the mold structure from which the tubing or tubings are extruded. Where two tubings are extruded and formed into an integral tubing, the resultant multi-ply board may include two layers each of a group of partition walls, the two groups of the partition walls intersecting each other.

---

The present invention generally relates to the manufacture of a multi-ply board of thermoplastic material which is used mainly for the commercial packaging of various articles during transportation. The invention is, more specifically, concerned with a new and improved method, and an apparatus adapted for carrying out the method, for manufacturing a multi-ply board of thermoplastic material which is formed with a pair of opposite external layers and an internal reinforcement layer which is sandwiched between the external layers integrally, the multi-ply board manufactured in the method and by the apparatus according to the present invention being in itself new and novel. The improved multi-ply board which is prepared in a manner herein described is advantageous especially for its increased mechanical resistance to bending stresses which are exerted to the board in different directions.

A variety of multi-ply boards of thermoplastic material are used for the purpose of packaging articles for transportation. Typical of such prior art multi-ply boards is the one that is known as the corrugated plastic board which is formed of a corrugated internal layer sandwiched by a pair of external layers which are adhered to the tops on both sides of the corrugations of the internal layer. The corrugated plastic board of such structure is adapted for the production on a large scale and, as such, has been commonly accepted in the industry especially for the packaging purposes. In spite of such a beneficial feature of the prior art multi-ply board, a problem is still experienced from the fact that, because of the very configurations of the corrugated internal layers, the board is significantly susceptible to a bending stress exerted to the board in the direction of the corrugations and, for this reason, is not suited for the heavy duty industrial packaging. Also encountered in the manufacture of such conventional corrugated plastic board is a problem that the production equipment which is required to form the corrugated internal layer of the board is so complicated in construction and operation that the cost of production is considerably increased so as accordingly to add to the price of the final product.

Thus, it has been of keen interest to the packaging industry of today to have available an improved multi-ply plastic board which is sufficiently mechanically resistant to bending stresses exerted in different directions and which can be manufactured with reduced production cost and on a large scale.

It is, therefore, an important object of the present invention to provide a new and improved method for manufacturing a new and improved multi-ply board of thermoplastic material, the multi-ply board being satisfactorily resistant to bending stressed in different directions.

It is another important object of the present invention to provide a new and improved method for manufacturing a new and improved multi-ply board of thermoplastic material, which board can be manufactured on a large scale commercial basis without resorting to involvement of complicated production equipment and skillful operations.

It is still another important object of the present invention to provide an apparatus which is specifically adapted to carry out the new method of the above noted character, which apparatus can be constructed without major and drastic modification of the existing plastic extruder and molding machines which are presently is common use for the formation of a hollow plastic article from a continuous tubular preform that is usually called the "parison" in the art.

It is still another important object of the present invention to provide a new and improved multi-ply board of thermoplastic material, which multi-ply board is suited especially for the heavy duty packaging of articles because of its increased mechanical strength in substantially all the directions.

According to a first outstanding feature of the present invention, a multi-ply plastic board is manufactured in such a manner as to form and downwardly feed a continuous tubing of fused thermoplastic material, which tubing has formed on its inner surface a plurality of equidistantly or unequidistantly spaced, parallel linear projections extending longitudinally of the tubing, twist the thus formed tubing whereby the linear projections are deviated sidewardly away from the longitudinal direction progressively as the tubing is drawn downwardly, introduce compressed air into the tubing so as to cause the tubing to expand to a predetermined diameter in section, deform the tubing into a substantially flat form with two opposite side walls, press the thus formed flat tubing into a flat sheet formed with a predetermined thickness while the tubing still remains in a fused state whereby the linear projections which are positioned in a face-to-face relationship on the above mentioned two opposite side walls are welded together so as to form a plurality of mutually intersecting partition walls which are sandwiched by a pair of external layers resulting from the outer wall of the extruded tubing, and cool the thus formed sheet thereby to cause the layers of the sheet to be set securely. The resultant multi-ply plastic board may be cut into individual sections of a predetermined size.

An apparatus which can be advantageously used to carry out such method according to the invention as described above is preferably made up of a mold structure which consists essentially of outer and inner dies between which is defined an annular passage communicating with a source of a fused thermoplastic material and opened downwardly for extruding therethrough a continuous tubing of fused thermoplatsic material, the inner die having formed on its outer peripheral wall defining the annular passage a plurality of equidistantly or unequidistantly spaced linear parallel threads or serrations extending longitudinally of the annular passage whereby a plurality of linear projections configured substantially in correspondence with the threads or serrations on the inner die are formed on the inner wall of the extruded tubing, means for downwardly drawing the thus extruded tubing, an air outlet communicating with a source of compressed air and opened substantially centrally of the bottom wall of the inner die, means adapted to rotate the mold structure whereby the downwardly extruded tubing is twisted and at the same time the linear projections on the inner wall surface of the tubing are deviated sidewardly away from the longitudinal direction progressively as the tubing is drawn downwardly, a guide member which is positioned underneath the mold structure and which is configured as circular in cross section at its upper open end facing the bottom wall of the mold structure and deformed downwardly progressively into a substantially flat form in cross section whereby the tubing guided therethrough is deformed into a substantially flat sheet which is formed with two opposite side walls, means to press the thus formed sheet to a predetermined thickness, and means to cool and set the resultant flat sheet.

The multi-ply plastic board which is formed in this manner is made up of a pair of spaced coexistensive external layers and an internal reinforcement layer which is sandwiched by the external layers and which is formed of a plurality of mutually intersecting partition walls which are integral on both sides thereof with the external layers.

According to a second outstanding feature of the present invention, a multi-ply board of thermoplastic material is manufactured in such a manner as to form and downwardly feeding two, inner and outer, concetric tubings of fused thermoplastic material, the outer tubing having formed on its inner surface a plurality of equidistantly or unequidistantly spaced, parallel linear projections extending longitudinally of the tubing, twist the inner and outer tubings whereby the linear projections are deviated sidewardly away from the longitudinal direction progressively as the tubings are drawn downwardly, introduce compressed air into the inner tubing and inbetween the outer and inner tubings concurrently whereby the two tubings are forced to expand to predetermined diameters until the tubings are brought into contact with each other whereby the obliquely extending projections formed on the inner surface of the outer tubing are fused integrally with the outer wall of the inner tubing, cool and set the resultant integral or single tubing, cutting the set tubing in the lengthwise direction, and develop the tubing into a substantially uniplanar multi-ply board which is formed of an internal layer made up of a plurality of partition walls and a pair of opposite external layers by which the internal layer is integrally sandwiched. The multi-ply board of thermoplastic material obtained in this manner may be thereafter cut into individual sections of a predetermined size or into blank sheets to be assembled into containers.

An apparatus which can be advantageously used to carry out the method according to the invention as described above is preferably made up of a mold structure which has formed therein outer and inner concentric passages which communicate with a source or sources of fused thermoplastic material and which is opened downwardly through concentric annular slots formed in the bottom wall of the mold structure whereby continuous outer and inner concentric tubings of thermoplasic material can be extruded through the outer and inner annular slots, respectively, the outer annular passage being defined by a smooth outer peripheral wall and an inner peripheral wall having formed thereon a plurality of equidistantly or unequidistantly spaced, parallel linear serrations extending longitudinally of the outer passage in the mold structure whereby a plurality of linear projections which are configured substantially in correspondence with the configurations of the serrations of the inner peripheral surface defining the outer annular slot are formed on the inner surface of the outer tubing, means downwardly feeding the thus extruded two tubings, means adapted to rotate the mold structure whereby the outer and inner tubings are concurrently twisted accordingly as they are fed downwardly and whereby the linear projections formed on the inner surface of the outer tubing are deformed into obliquely extending, substantially linear projections, outer and inner air outlets communicating with a source or sources of compressed air, the outer air outlet being opened between the outer and inner annular slots in the bottom wall of the mold structure and the inner air outlet being opened substantially at the center of the bottom wall of the mold structure wherein compressed air is introduced into the inner tubing and inbetween the outer and inner tubings concurrently so that the two tubings are forced to expand to predetermined diameters until the tubings are brought into contact with each other whereby the obliquely extending projections on the inner surface of the outer tubing are fused integrally with the outer wall of the inner tubing, means to cool and set the thus formed integral or single tubing, means to cut the set tubing in the lengthwise direction, and means to develop the cut tubing into a substantially uniplanar multi-ply board of thermoplastic material.

The multi-ply board formed in this manner is substantially similar in construction to the first embodiment of the board according to the present invention.

If, in this instance, it is desired, the inner and outer tubings may be twisted reciprocally in the clockwise and counter clockwise directions through a predetermined angle so that the linear projections formed on the outer tubing are deformed into winding or meandering projections as the tubings are drawn downwardly.

The multi-ply plastic board which is formed in this manner is made up of a pair of spaced, substantially uniplanar, coexistensive external layers and an internal reinforcement layer which is sandwiched between the two external layers and which is formed of a plurality of parallel meandering partition walls which are integral with the two external layers.

Furthermore, the set tubing which is made up of two inner and outer layers may be deformed into a substantially flat sheet made up of a total of four layers while the tubing remains in a fused state, in lieu of cutting the set tubing in the lengthwise direction. The multi-ply plastic board produced in this manner is made up of a pair of structural layers which are integral with each other and each of which includes internal and external basic layers and an intermediate layer formed of a plurality of mutually intersecting or meandering partition walls which are integral with the internal and external basic layers.

According to a third outstanding feature of the present invention, a multi-ply plastic board of thermoplastic material is manufactured in such a manner as to form and downwardly feeding two, inner and outer, concentric tubings of fused thermoplastic material, the outer tubing having formed on its inner surface a plurality of equidistantly or unequidistantly spaced, parallel linear projections extending longitudinally of the tubing, twist the inner and outer tubings whereby the linear projections are deviated sidewardly away from the longitudinally direction progressively as the two tubings are drawn downwardly, introduce compressed air into the inner tubing and in between the inner and outer tubings concurrently whereby the two tubings are forced to expand to predetermined diameters until the tubings are brought into contact with each other whereby the obliquely extending projections on the inner surface of the outer tubings are fused integrally with the outer wall of the inner tubing, cut the resultant integral tubing in the longitudinal direction thereof before the integral tubing becomes set, develop the cut tubing whereby the longitudinal edges thereof are held in a face-to-face relationship with each other, interpose a sheet of fused foaming plastic material between the facing sides of the cut tubing, press the facing sides of the cut tubing into a substantially flat sheet made up of three layers which are fused with each other, and cool and set the resultant flat sheet.

An apparatus which can be advantageously used to carry out the method above described is basically similar to the apparatus constructed to carry out the first embodiment of the method according to the present invention but further includes means to extrude the sheets of fused foaming plastic material between the facing sides of the cut tubing.

The multi-ply plastic board formed in this manner is made up of two substantially uniplanar structural layers each of which has formed on its inner surface a plurality of linear projections and an intermediate layer of foaming plastic material which is adhered to the external layers through the projections formed thereon.

Other objects, features and advantages of the new and improved method, apparatus and product according to the present invention will become more apparent from the following description taken in conjunction with the accompanying drawings which are presented solely for illustration purposes and in which:

FIG. 1 is a side elevation showing, partially in section, a preferred example of the ararngements of carrying out the method according to the invention, the shown arrangement constituting a first preferred embodiment of the apparatus proposed to put into practice the invention;

FIG. 6 is a schematic vertical sectional view showing means which may be used in the arrangement of FIG. 1 for drawing and heating the biaxially oriented tubing to form a multi-ply plastic board according to the present invention;

FIG. 7 is a schematic side elevation showing, on an enlarged scale, essential elements of the means shown in FIG. 6;

FIG. 8 is also a side elevation, partly in a cut-away view, of a preferred example of the arrangement of carrying out the method according to the invention, the shown arrangement constituting a second preferred embodiment of the apparatus adapted to put the invention into practice;

FIG. 9 is a vertical sectional view showing, on an enlarged scale, the essential elements of the arrangement shown in FIG. 8;

FIG. 10 is a view showing the configurations in cross section of the projections formed on the inner surface of the outer tubing, wherein (I) and (II) are cross sections of the outer and inner tubings taken on lines I—I and II—II in FIG. 9;

FIG. 11 is a view showing different preferred examples of the configurations in cross section of the serrations to be formed on the outer surface defining the outer annular slot in the mold structure illustrated in FIGS. 8 and 9;

FIG. 16 is a partial sectional view showing the heating and cooling device used in the arrangement of FIG. 15;

FIG. 17 is similar to FIG. 16 but illustrates a modified form of the heating and cooling device to be used in the arrangement of FIG. 15;

FIG. 18 is a side elevation, partly in a cut-away view, of a preferred example of the arrangement of carrying out the method according to the present invention, the shown arrangement constituting a third preferred embodiment of the apparatus adapted to put the invention into practice;

FIG. 19 is a sectional view partially showing examples of the construction of the multi-ply plastic board manufactured by the use of the arrangement shown in FIG. 18; and FIG. 20 is a view showing patterns of the linear projections formed on the inner surfaces of the external layers of the multi-ply plastic board produced in the arrangement of FIG. 18.

Figure 2I:
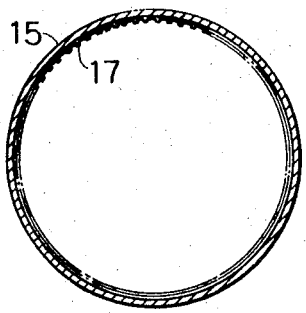
FIG. 2 is a view showing different sections of an extruded tube which is being deformed as it is drawn downwardly.

Referring first to FIG. 1, the arrangement, or the apparatus, is shown to comprise an extruder machine 10 which is constructed and operated similarly to the conventional manners. The extruder machine 10 has a mixing and feeding screw 11 by which a thermoplastic material in a fused state is fed from a source (not shown) of the thermoplastic material. The extruder machine 10 is connected at its bottom portion to a mold structure 12 which consists essentially of spaced outer and inner dies 12a and 12b, respectively. Defined by these outer and inner dies 12a and 12b is a passage 13 which is opened to the outside in the form of an annular slot 14 at the bottom wall surface of the mold structure 10, as shown. The passage 13 communicates with the extruder machine 10 so that the fused thermoplastic material which has been fed through the screw 11 is extruded through the annular slot 14 downwardly in the form of a continuous tubing 15 which is usually known as the parison in the art.

As an outstanding feature of the method, and apparatus as well, according to the present invention, the inner die 12b has formed on its outer peripheral wall a plurality of equidistantly or unequidistantly spaced, parallel linear serrations 16 which extend longitudinally of the mold structure 12. With provision of such serrations 16, a plurality of linear projections 17 are consequently formed on the inner wall surface of the tubing 15 which has been extruded through the annular slot 14, which projections are configured substantially in correspondence with the linear serrations 16 formed on the inner die 12b.

The mold structure 12 is operatively connected to a suitable driving source (not shown) through a rotary gear 18 and is rotated thereby at a speed determined in relation to the rate at which the tubing 15 is extruded from the mold structure 12.

An air passage 19 which communicates with a source (not shown) of compressed air is formed in the mold structure 12 and is opened downwardly through an air outlet 19a which is formed preferably centrally in the bottom wall of the inner die 12b, as illustrated, whereby air compressed to a predetermined pressure is introduced into the tubing 15 extruded through the annular slot 14 so that the tubing 15 is expanded.

Underneath the mold structure 12 is positioned, at a suitable spacing therefrom, a guide member 20 which may be either of a unitary or multi-piece structure. The guide member 20 is opened at its upper and lower ends and is configured as circular at its upper end facing the bottom wall of the mold structure 12 and as substantially flat at its lower end. The tubing 15 which has been extruded through the annular slot 14 is introduced into the thus shaped guide member 20 and, because of the fact that compressed air is forced into the tubing, the tubing 15 is forced against the inner wall surface of the guide member 20 so that it is deformed substantially in correspondence with the configuration of the guide member. The configuration of the thus deformed tubing 15 is more clearly illustrated in FIG. 2, which illustrates different sections of the tubing being deformed, as taken on lines I—I, II—II, III—III and IV—IV of FIG. 1.

Figure 2:
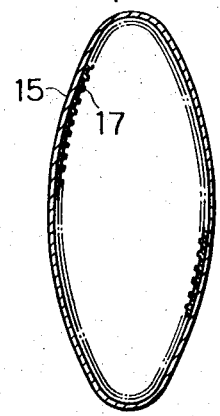

As illustrated, the tubing 15 is completely circular in cross section when it enters the upper circular edge of the guide member 20 as seen in (I) of FIG. 2. As the tubing lowers to that portion of the guide member 20 which is indicated by line II—II in FIG. 1, it is then deformed into an oval form in cross section as seen in (II) in FIG. 2. As the tubing 15 is further fed downwardly to a portion indicated by line III—III in FIG. 1, then the tubing is deformed into an elongated oval form in cross section as shown in (III) of FIG. 2. When, now, the tubing 15 reaches the substantially lowermost portion of the guide member 20 as indicated by line IV—IV in FIG. 1, the tubing is deformed into a substantially flat form as seen in (IV) of FIG. 2.

The tubing 15 which is eventually deformed into the form of a flat sheet as denoted by reference numeral 15a in FIG. 1 in this manner is then passed between a pair of pressing rollers 21 and 21' which are positioned below the lowermost edge of the guide member 20 and in a face-to-face relationship with each other with a substantial spacing therebetween. Simultaneously as the tubing 15 or now more exactly a flat sheet 15a of thermoplastic material which still remains in a substantially fused state at this stage is passed between the opposite pressing rollers 21 and 21', the two sets of obliquely extending projections formed on the facing inner surfaces of the opposite side walls of the flat sheet 15a are fused together so as to form mutually intersecting integral partition walls. The partition walls thus produced internally of the flat sheet 15a forms an internal reinforcement layer which is integral not only in itself but with the outer layers.

The flat sheet 15a of thermoplastic material is then fed to a suitable cooling device 22 by which the individual layers are cooled and set. The cooling device 22 to be used for this purpose may be of any suitable type such as the water cooling or air cooling type. The flat sheet 15a of thermoplastic material is set into a continuous multi-ply board 15b in this manner. The resultant multi-ply board 15b may thereafter be fed by a pair of feeding rollers 23 and 23' for temporary storage or for being cut to a predetermined size by a suitable cutting means (not shown).

The mold structure 12 is rotated at a speed which is determined in relation to the rate at which the tubing 15 is extruded therefrom, as previously discussed. Regulation of the revolution speed of the mold structure 12 in this manner may be performed by the use of a suitable speed changing machanism or a speed reducer of known construction.

Figure 3:
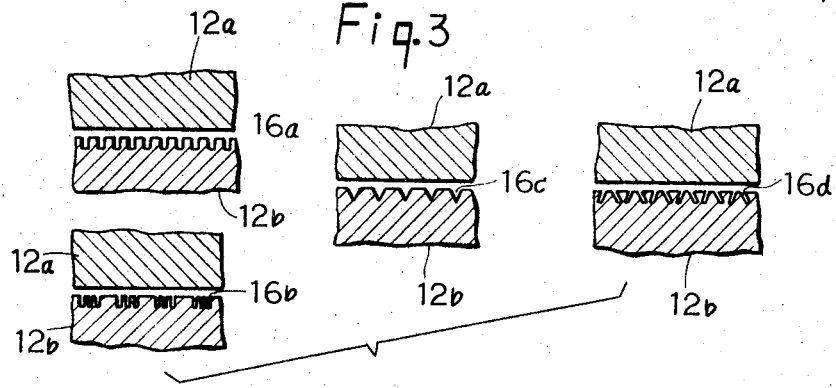
FIG. 3 is a view showning different preferred examples of the configurations in section of the serrations to be formed on the outer peripheral wall of the inner die which forms part of the rotary mold structure to be used in the apparatus carrying out the method according to the invention.

The plurality of equidistantly or unequidistantly spaced linear serrations 16 to be formed on the outer wall surface of the inner die 12b may be configured in different manners depending upon the desired pattern of the finally formed partition walls. For instance, the serrations may be configured in section as rectangular, equidistantly spaced linear threads as designated by reference numeral 16a in (A) of FIG. 3. Such rectangular threads may be disposed unequidistantly as shown by reference numeral 16b in (B) of FIG. 3, if preferred. Or otherwise, the serrations may be configured as equidistantly spaced trapezoidal threads 16b or alternatively as threads 16d which are substantially in the form of alternately upright and inverted letter V, as illustrated in (C) and (D), respectively, of FIG. 3.

The guide member 20, which is configured in a manner previously mentioned, may preferably be made of a metal or any other suitable heat resisting material, having an internal surface which is well finished so as to enable the extruded tubing to smoothly slide down. Also, the guide member 20 may be either a unitary member or made up of two or more individual members.

Figure 5:
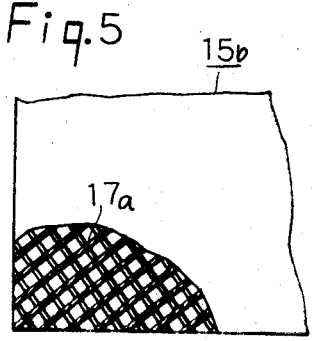
FIG. 5 is a plan view showing, partially in a cut-away view, the multi-ply plastic board shown in FIG. 4.
Figure 4:
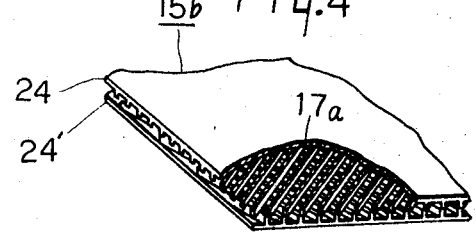
FIG. 4 is a perspective view showing, partially in a cut-away view, an example of the multi-ply plastic board which is manufactured by the method and apparatus according to the invention.

An example of the multi-ply board of thermoplastic material produced in the method and by the apparatus according to the invention is illustrated, partly in a cutaway view, in FIGS. 4 and 5, from which it will be seen that a plurality of mutually intersecting partition walls 17a are formed internally of the opposite side walls 24 and 24'.

The thermoplastic material to be used as the material of the multi-ply board according to the invention may be of any suitable type, including a high-density polyethylene, polypropylene, polystyrene, a copolymer of acrylonitrile butadiene styrene, and polycarbonate.

It will now be understood from the foregoing description that an improved method of manufacturing an improved multi-ply board of thermoplastic material is provided by this invention, which method is characterized by the formation of a plurality of obliquely extending, equidistantly or unequidistantly spaced linear projections on the inner wall surface of an extruded tubing of fused thermoplastic material concurrently as the tubing is internally blown and expanded with compressed air as in the conventional blow molding of a hollow article and the deformation of the tubing thus having a plurality of obliquely extending linear projections formed on its inner wall surface in such a manner as to be rendered into a continuous flat sheet which is thereafter cooled and set into a multi-ply board which is formed with a plurality of mutually intersecting partition walls constituting an internal layer sandwiched by two side walls. Since, in this instance, not only the plurality of projections but also the micells in the side walls are oriented in a manner to intersect, on different planes, each other in the set product, the resultant multi-ply board is endowed with an increased mechanical resistance to bending stresses in different directions and, as such, the multi-ply board realized by this invention may be referred to as a mechanically isotropic multi-ply board.

Such isotropic mechanical resistance to bending stresses may be further increased through regulation of the revolution speed of the mold structure 12. If, for instance, the mold structure 12 is rotated at an increased speed relative to the rate at which the tubing 15 is extruded therefrom, then the linear projections 17 on the inner wall surface of the tubing will be deviated sidewardly at a greater angle and as a consequence the pattern of the resultant partition walls to be formed inside the opposite side walls will become denser, adding to the isotropic mechanical strength of the final product.

If, on the other hand, the mold structure 12 is held at rest, namely, unless the mold structure 12 is not rotated during operation, then a multi-ply board which is comparable in mechanical strength with a conventional corrugated multi-ply board will be produced by the use of the apparatus proposed to carry out the present invention without any modification made thereto.

The mold structure 12 which is used in carrying out the method of the invention may be of any known construction which is commonly accepted in the art of blow molding hollow articles of thermoplastic material.

The compressed air to be introduced into the extruded tubing 15 may only be pressurized to such as extent as to cause the tubing to be held in contact with the inner wall surface of the guide member 20 and, therefore, the tubing 15 can be internally maintained at a substantially constant pressure even though the formed multi-ply board 15b has a leading end which is opened to the air.

It will now be appreciated from the foregoing description that the present invention is intended to provide a new and improved method and apparatus for producing a new and improved multi-ply board of thermoplastic material without resorting to major and drastic modification of the existing molding equipment and at a low production cost.

The tubing which has been deformed into an elongated oval form as it leaves the guide member 20 may be pressed into a flat sheet in a different manner if desired, an example being illustrated in FIGS. 6 and 7.

In the arrangement shown in FIGS. 6 and 7, a pair of guide rollers 25 and 25' are positioned below the guide member 20. The guide rollers 25 and 25' are positioned substantially in alignment with the lowermost edge of the guide member 20 and are spaced from each other at a distance which is substantially equal to the width of the opening formed at the lower end of the guide member 20. The guide rollers 25 and 25' thus serve to smooth the external surfaces of the oval tubing as the tubing passes therebetween, applying substantially no pressure to the tubing being guided.

A pair of cutting means or knives 26 and 26' are mounted below the guide rollers 25 and 25'. The knives 26 and 26' are positioned in a manner to cut the lengthwise edge of the oval tubing which has passed through the guide rollers 25 and 25', as clearly seen in FIG. 7 which shows essential parts of the posterior stage of the arrangement implementing the present invention. The oval tubing is in this manner severed into two substantially identical sheets which still remain in a fused state at this instant.

Below the cutting knives 26 and 26' is mounted a suitable heating means 27 which is positioned in alignment with the cutting knives 26 and 26' so that the severed sheets are heated at their internal surfaces. The heating means 27 may comprise a thin sheet metal 27a having polished surfaces on both sides and suitable heating elements 27b which may be electrically highly resistive conductors powered by an electric power source (not shown). The severed sheets of thermoplastic material having a plurality of linear projections formed on their internal surfaces are thus heated internally by the heating means 27 and are then passed through the pressing rollers 21 and 21' so that the linear projections on the severed sheets are fused together. The resultant sheet 15a is then cooled and set as it passes through the cooling device 22, similarly to the arrangement shown in FIG. 1.

The multi-ply plastic board which is formed in the modified arrangement of FIGS. 6 and 7 is essentially similar to that manufactured in the arrangement shown in FIG. 1, i.e., to the board illustrated in FIGS. 4 and 5.

A second embodiment of the arrangement according to the present invention is now illustrated in FIGS. 8 and 9.

Referring to FIGS. 8 and 9, the arrangement, or the apparatus, is shown to comprise an extruder machine 10 which is constructed and operated similarly to the conventional manner and, as such, is herein described only briefly. The extruder machine 10 has, similarly to the arrangement of FIG. 1, a mixing and feeding screw 11 by which a thermoplastic material in a fused state is fed from a source (not shown) of the thermoplastic material which is usually used in the field of blow molding of hollow articles. The extruder machine 10 is connected at its bottom portion to a mold structure 28. In the mold structure 28 are formed outer and inner annular passages 29 and 30, respectively, which lead from a common passage 31 communicating with the extruder machine 10 at its top portion. The outer and inner passages 29 and 30 are opened through annular substantially concentric slots 29a and 30a, respectively, which are formed in the bottom wall of the mold structure 28. The passages 29 and 30 and the respective annular slots 29a and 30a are such that continuous, substantially concentric outer and inner tubings 32 and 33, respectively, of fused thermoplastic material supplied through the common passage 31 are extruded through the slots 29a and 30a. Here it may be noted that, although the outer and inner passages 29 and 30, respectively, are shown to lead from a common passage 31 that communicates with the source of thermoplastic material, they may be, if desired, arranged to communicate direct with separate sources of different types of thermoplastic materials which may be in different states.

The outer passage 29 is defined by a smooth outer peripheral wall and an inner peripheral wall which has formed thereon a plurality of equidistantly or unequidistantly spaced, parallel linear serrations 34 extending longitudinally of the passage 39 so that, when the thermoplastic material in a fused state is passed therethrough, a plurality of linear projections 35 which are configured substantially in correspondence with the configurations of the serrations 34 on the inner peripheral wall of the passage 29 are formed on the inner surface of the tubing 32 extruded through the outer annular slot 29a.

The mold structure 28 constructed and arranged in this manner is rotated at a predetermined speed. As the outer and inner tubings 32 and 33, respectively, are extruded and drawn downwardly by suitable feeding means to be later described, the linear projections 35 formed on the inner surface of the outer tubing 32 are deviated from the longitudinal direction into parallel, obliquely extending projections which are denoted by reference numeral 34a.

Outer and inner air outlets 36 and 37, respectively, are formed in the bottom wall of the mold structure, both communicating with a source or respective sources (not shown) of compressed air and through air passages 36a and 37a. The outer air outlet 36 is opened between the concentric outer and inner annular slots 29a and 30a in the bottom wall of the mold structure 28 so that air compressed to a predetermined pressure is introduced inbetween the outer and inner extruder tubings 32 and 33, respectively. The inner air outlet 37, on the other hand, is opened substantially at the center of the bottom wall of the mold structure 28, whereby air compressed to a predetermined pressure is also introduced into the inner tubing 33. Here, the air outlets 36 and 37 may lead from a common air passage 38 communicating with a source (not shown) of compressed air so that the pressure to which air to be ejected through the air outlet 36 and 37 may be of the same or different levels, as the case may be. As a result of the introduction of compressed air in this manner, the tubings 32 and 33 are forced to expand to predetermined diameters in cross section until the two tubings are brought into contact with each other. Referring to FIG. 9 which illustrates the construction of the mold structure 28 in more detail, the outer and inner tubings 32 and 33, respectively, are spaced from each other when they are initially blown and expanded, as shown in (I) of FIG. 10 which illustrates the section of the tubings 32 and 33 taken on line I—I in FIG. 9.

As the tubings 32 and 33 are fed downwardly and expanded to such an extent as to be held in close contact with each other, the winding or meandering projections on the inner surface of the outer tubing 32 are fused to the opposite outer surface of the inner tubing 33 since, at this stage, the thermoplastic material forming the tubings still remains in a fused state. The separate or spaced two tubings 32 and 33 are combined into a single and integral tubing in this manner.

The thus formed single tubing is then passed through suitable means 39 which is adapted to cool the tubing so that the tubing is cooled and set. The resultant tubing, denoted now by reference numeral 40, is illustrated in cross section in (II) of FIG. 10 which illustrates the section on line II—II of the tubing 40 in FIG. 9. As illustrated, the tubing 40 is formed of three integral layers of an external layer 32a resulting from the outer peripheral wall of the initial outer tubing 32, an internal layer 33a resulting from the initial inner tubing 33, and an intermediate layer 32b which has resulted from the meandering projections 19a on the inner surface of the initial outer tubing 32 and which is formed of a plurality of spaced, parallel, meandering partition walls which are integral with the external and internal layers 32a and 33a, respectively.

The cooling means 39 may be of any known construction, including a cooling device of water cooling or air cooling type. If desired, a second cooling means 39' may be provided past the first cooling means 39, as indicated by phantom lines in FIG. 8.

Underneath the cooling means 39 or the second cooling means 39', if any, is mounted means adapted to develop the cooled and set tubing 40 in cooperation with means adapted to cut the tubing 40 in the lengthwise direction. As illustrated in FIG. 8, the tubing 40 which is set and fed downwardly is caused to slide upon the outer peripheral wall surface of a developing device 41 which is positioned in alignment with the downwardly fed tubing 40. The developing device 41 has a substantially rounded upper end portion which is circular in cross section and is gradually flattened toward the lower portion thereof. The substantially cylindrical upper portion of the developing device 41 is so sized as to closely receive therein the tubing 40 which is depending from the mold structure 18. A suitable cutting device 42 is mounted adjacent the upper portion of the developing device 41, whereby the tubing 40 sliding down the substantially cylindrical upper portion of the developing device 41 is cut and opened in the lengthwise direction.

A series of suitably spaced pressing rollers such as illustrated as rollers 43, 44 and 45 in FIG. 8 are positioned relative to the lower portion of the developing device 41 so that, because the developing device is gradually flattened toward its lower portion, the tubing 40 which has previously been cut and developed is deformed into a flat sheet as it is pressed by the pressing rollers 43, 44 and 45 onto the lower peripheral surface of the developing device 41. The resultant substantially uniplanar multi-ply board formed of three integral layers resulting from the layers 32a, 32b and 33a (FIG. 10) may be thereafter passed between a pair of feeding rollers 46 and 46' for temporary storage or for being cut into smaller pieces of a predetermined size.

The mold structure 28 is rotated at a speed which is determined in relation to the rate at which the two outer and inner tubings 32 and 33, respectively, are extruded through the annular slots 29a and 30a, as previously discussed. Regulation of such reciprocating rotation of the mold structure 28 may be performed by the use of a suitable speed changing mechanism or speed reducer of known construction.

The plurality of equidistantly or unequidistantly spaced, parallel linear serrations 34 to be formed on the inner peripheral wall of the outer passage 29 in the mold structure 28 may be configured in different manners depending upon the desired pattern of the finally formed partition walls to constitute the intermediate layer of the multi-ply board according to the invention. For instance, the serrations may be configured in section as rectangular, equidistantly spaced linear threads as designated by reference numeral 34a in (A) of FIG. 11. Such rectangular threads may be disposed unequidistantly as shown by reference numeral 34b in (B) of FIG. 11, if desired. Or otherwise, the serrations may be equidistantly spaced trapezoidal threads 34c or, as an alternative thereto, as threads 34d which are substantially in the form of alternately upright and inverted letter V as illustrated in (C) and (D), respectively, of FIG. 11.

The developing device 41 used in the arrangement of the present invention, shaped in a manner previously described, may be made of a metal or any other solid material and has an outer surface which is satisfactorily polished to enable the tubing to slide smoothly thereon. Also, the developing device 41 may be a hollow structure communicating with a source of temperature regulated atmosphere, so that the temperature of the peripheral wall surface of the developing device can be adjusted during operation.

Figure 12:
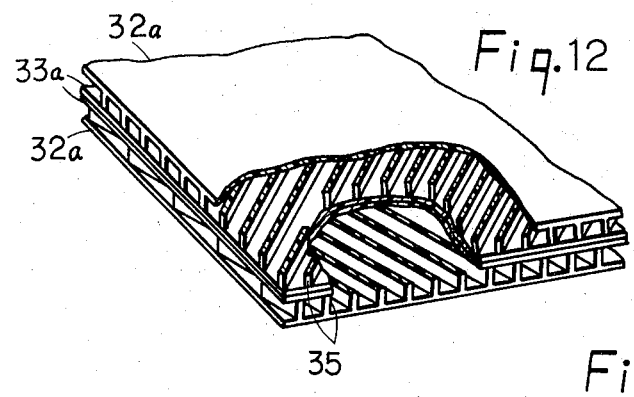
FIG. 12 is a perspective view showing, partly in a cut-away view, an example of the multi-ply plastic board manufactured by the use of the arrangement shown in FIG. 8.

An example of the multi-ply board of thermoplastic material produced in the method and by the apparatus according to the present invention is illustrated, partly in a cut-away view, in FIG. 12, from which it will be seen that a plurality of spaced, parallel, linear partition walls which are substantially similar to those shown in FIGS. 4 and 5 are integrally sandwiched by a pair of opposite external layers and which have resulted from the external layer 32a and the internal layer 33a of the tubing 40 show in FIG. 10.

The thermoplastic material to be used as the material of the multi-ply board to be produced in this embodiment of the arrangement according to the present invention may be of any suitable type which is usually utilized for the blow molding of hollow articles, including high-density polyethylene, polypropylene, polystyrene, hard or soft polychloride vinyl and a copolymer of these.

It will now be understood from the foregoing description that an improved method for manufacturing an improved multi-ply board of thermoplastic material is provided by this invention, which method is characterized by the extrusion of substantially concentric outer and inner tubings of thermoplastic material concurrently, formation of a plurality of equidistantly or unequidistantly spaced, obliquely extending linear projections on the inner surface of the outer tubing concurrently as the tubings are fed downwardly and expanded with compressed air, adhering the two outer and inner tubings to each other so as to form a single and integral tubing having three layers including an intermediate layer of spaced meandering partition walls, and development of the thus formed single tubing into a flat sheet.

Since, in this instance, not only the initially linear projections on the inner surface of the outer tubing but also the outer and inner tubings as a whole are reciprocally twisted as they still remain in a fused state, the resultant multi-ply board is endowed with an increased mechanical resistance to bending stresses exerted to the board in different directions and, as such, the multi-ply board may well be referred to as a mechanically isotropic multi-ply board.

Such isometric mechanical resistance to bending stresses may be further increased through proper regulation of the speed at which the mold structure is rotated. If, for instance, the mold structure is rotated at an increased speed relative to the rate at which the tubings are extruded therefrom, then the linear projections initially formed on the inner surface of the outer tubing will be deviated more steeply so that the mechanical strength of the resultant multi-ply board in different directions will be increased accordingly.

If, on the other hand, the mold structure is held at rest, namely, unless the mold structure is not rotated, then a multi-ply board which is compatible in mechanical strength with a conventional corrugated multi-ply board will be produced by the use of the apparatus proposed to carry out the method according to the present invention without any modification made thereto.

The mold structure which is used in carrying out the method as described above may be of any known construction which is commonly accepted in the art of blow molding hollow article of thermoplastic material.

The compressed air to be introduced into the outer and inner tubings may only be pressurized to such an extent as to cause the tubings to expand until they are brought into close contact with each other through the obliquely extending projections and, for this reason, the tubings can be internally maintained at a substantially constant pressure or pressures even though the two tubings are combined into a single tubing and opened.

It will now be appreciated from the foregoing description that the second embodiment of the present invention is intended to provide a new and improved method and apparatus for producing a new and improved multi-ply board of thermoplastic material without resorting to major and drastic modification of the existing molding equipment and a low production cost. It should, however, be borne in mind that, the method, apparatus and product can be varied and modified in numerous manners. As an example, the spaced linear serrations which are herein described and shown to be formed on the inner surface of the outer tubing may be formed on the outer surface of the inner tubing, if desired; such modified method, and an apparatus modified accordingly, will result in a multi-ply board of the same structure as has been described and shown and, therefore, should be deemed as the entire equivalent of the method and apparatus described with reference to FIGS. 8 and 9.

By preference, the tubing 40 expanded and downwardly drawn from the mold structure 28 may be processed in a manner illustrated in FIG. 1 or 6 with use of a guide member 20 shown therein. In this instance, the tubing 40 is deformed gradually into an elongated oval form as illustrated in FIG. 2. The thus formed substantially flat tubing is then pressed on its both sides so that the facing sides of the tubing are adhered to each other. The construction of the resultant plastic board is illustrated in FIG. 12.

As illustrated in FIG. 12, the multi-ply plastic board comprises two substantially uniplanar structural layers each of which is made up of an external layer resulting from the outer tubing 32a, an internal layer resulting from the inner tubing 33a and an intermediate layer of partition walls resulting from the projections 35. Thus, it will be seen that the multi-ply plastic board shown in FIG. 12 is a combination of two plastic boards which are produced in a manner described with reference to FIG. 1 or 6. The plastic board shown in FIG. 12 is advantageous because the partition walls of the two structural layers are in crossing relationship with each other so that a mechanical stress in any direction can be withstood effectively.

If desired, the pattern of the partition walls to form the intermediate layer of the multi-ply plastic board produced in the methods described in connection with the drawings may be modified in various manners. For instance, the mold structure may be rotated reciprocally in the clockwise and counter clockwise directions so as to form winding or meandering projections on the expanded tubing. FIG. 12 illustrates a modification of the arrangement of FIG. 8 which is modified for this purpose.

Figure 13:
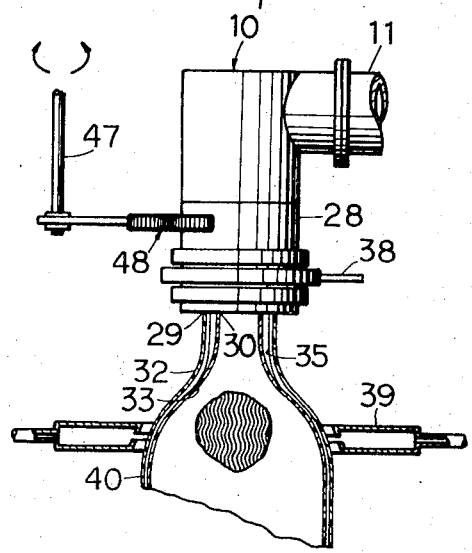
FIG. 13 is similar to FIG. 8 but illustrates a modification of the arrangement shown therein.

As illustrated in FIG. 13, the mold structure 28 is operatively connected to a suitable driving means 47 through a gearing 48, whereby the mold structure 28 is rotated in the clockwise and counter clockwise directions alternately through a predetermined angle. As the outer and inner tubings 32 and 33, respectively, are expanded and downwardly drawn from the mold structure 28, the linear projections 35 which have been formed on the inner surface of the outer tubing 32 are deformed into spaced, parallel, winding or meandering projections which are denoted by reference numeral 34b.

Figure 14:
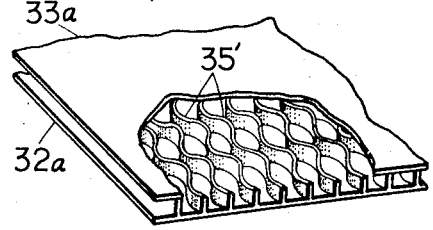
FIG. 14 is a perspective view showing, partially in a cut-away view, another example of the multi-ply plastic board according to the invention.

If, in this instance, the resultant tubing 40 is developed and severed in the longitudinal direction and pressed into a flat sheet as in the arrangements shown in FIGS. 6 and 8, then a multi-ply plastic board will be produced which is made up of two external layers 32a and 33a resulting from the outer and inner tubings 32 and 33, respectively, and an intermediate reinforcing layer of winding or meandering partition walls 35' resulting from the meandering projections 35 formed on the inner surface of the outer tubing 32, as illustrated in FIG. 14.

If, on the other hand, the tubing 40 is processed in the same manner as in the arrangements of the first embodiment of the present invention as described with reference to FIG. 1 or 6, the resultant plastic board will be the one that is essentially similar to that which is illustrated in FIG. 12. The plastic board is, however, different from the board of FIG. 12 in that the partition walls to be formed within the two structural layers thereof are meandering.

Figure 15:
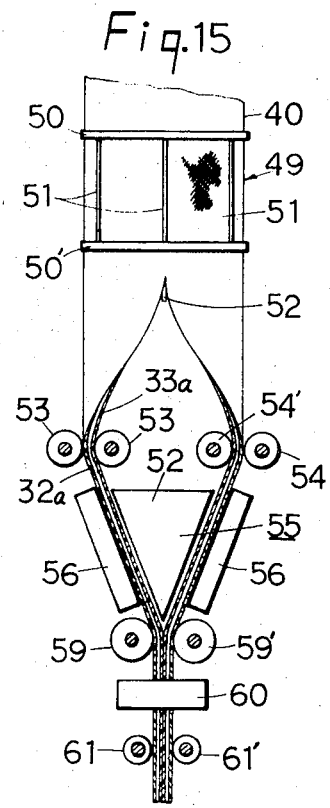
FIG. 15 is a side elevation showing, partially in a cut-away view, a second modification of the arrangement shown in FIG. 8.

Where, now, the expanded tubing is to be twisted through rotation of the mold structure, the angle of twisting of the tubing may preferably be regulated in a suitable manner. An example of such twist-angle regulating means is illustrated in FIG. 15, in which the twist-angle regulating means is generally represented by reference numeral 49. The twist-angle regulating means 49 comprises, as illustrated, upper and lower frame members 50 and 50' which are spaced from each other, a plurality of supporting members 51 securing the frame members 50 and 50' in position, and a meshed member 52 which is internally mounted on the supporting members 51. The meshed member 52 may be a meshed netting or a sheet of cloth. The twist-angle regulating means 49 is positioned substantially in alignment with the mold structure (not herein shown) so as to closely receive the expanded tubing 40 which is herein shown as made up of inner and outer layers 32a and 33a which are extruded from the mold structure 28 shown in FIG. 8.

Where, moreover, the mold structure 28 which is shown in FIG. 8 or 13 is to be used for the purpose of manufacturing the multi-ply plastic board shown in FIG. 12 and if it is desired to have the outer surfaces of the external layers 32a (FIG. 12) finished to be more smooth and to have the internal layers 33a adhered to each other more closely, the expanded tubing 40 may be cooled on its outer surface and heated on its inner surface concurrently before the tubing is pressed into a flat sheet in the succeeding stage. A device which is adapted to achieve this purpose is shown by way of example in the lower part of FIG. 15.

As seen in FIG. 15, the tubing 40 which is expanded and twisted as it is drawn downwardly from the mold structure is severed in the longitudinal direction by a suitable cutting means 52 and is thus developed by means of drawing rollers 53 and 53', and 54 and 54' into the form of a sheet which is made up of an external layer 32a and an internal layer 33a. A combination of heating and cooling means 55 and 56, respectively, is mounted below the drawing rollers. The heating means 55 is a generally conical, hollowed structure with its pointed tip directed downwardly and is positioned to be in sliding contact with the inner surface of the internal layer 33a. The cooling means 56, on the other hand, is a generally frusto-conical structure with its reduced end directed downwardly and is positioned to be in sliding contact with the outer surface of the external layer 32a. The detailed constructions of the heating and cooling means are more clearly seen in FIG. 16.

Referring to FIG. 16, the heating means 55 comprises a hollowed conical member 57 and a heating element 58 mounted within the conical member 57. The conical member 57 has formed in its side wall a plurality of apertures 58a and an air vent 58b which is formed in the upper end wall of the member 58. The heating element 58 may be a plurality of electrically high resistive conductors which are connected to a suitable electric power source (not shown). The heat evolved in the conical member 57 by energizing thec onductors 58 in transferred to the inner surface of the internal layer 33a of the severed tubing through the apertures 57a so that the layer 33a is fused or softened on its inner surface. The cooling means 56 may be an air or water cooling device of any known construction whereby the external layer 32a of the severed tubing is cooled on its outer surface even though the tubing is heated internally by the heating means 55.

A pair of pressing rollers 59 and 59' are mounted below the thus constructed heating and cooling means 55 and 56, respectively, whereby the facing sides of the severed and developed tubing which has been internally heated and externally cooled are pressed to each other into an integral flat sheet. The resultant flat sheet is cooled and set when it is passed through a final cooling device 60. Designated by reference numerals 60 and 61 are feeding rollers which convey the finally produced plastic board to a succeeding storing or packaging stage (not shown).

The heating and cooling means 55 and 56, respectively, may be modified in various manners insofar as the developed tubing is internally heated and externally cooled, an example of such modifications being illustrated in FIG. 17. In FIG. 17, the heating means 55' is shown to comprise a belt 62 driven by means of cooperating gears 63 and 63' so as to slide on the inner surface of the internal layer 33a which is being fed downwardly. Hot steam is supplied into the thus constructed heating means 55' to heat the internal layer 33a on its inner surface. The cooling means 56', on the other hand, has a belt 64 which is driven by means of cooperating gears 65 and 65' so as to slide on the outer surface of the external layer 32a of the developed tubing. Cool water is supplied into the cooling means 56' to cool down the external layer 32a on its outer surface.

FIG. 18 now illustrates a third embodiment of the present invention.

In the arrangement shown in FIG. 18, a single tubing is extruded and expanded as in the arrangement of FIG. 1. The steps and the devices therefor are thus entirely similar to those in the arrangement of FIG. 1 and as such detailed discussion thereof may be herein omitted.

The single tubing which is expanded and rotated as it lowers at a selected speed as shown by reference numeral 15 is cut in the longitudinal direction by a cutting means 52 which may be a cutting knife. The tubing 15 is in this manner opened into the form of a sheet having longitudinal edges. The sheet thus formed and now having its sides 15a and 15b opposite to each other is then guided by a series of guide rolls 66, 67 and 68 and 66', 67' and 68' whereby the sheet 15a is further opened with its longitudinal edges spaced wider from each other. A pair of pressing rolls 69 and 69' which are spaced from each other at a predetermined distance are mounted posterior to the last guide rolls 69 and 69' and in alignment with the path of the tubing 15 depending thereabove. A die 70 is mounted immediately above the allowance between the pressing rolls 69 and 69'. The die 70 has stored therein a suitable foaming resin in a fused state and has formed at its lower end an elongated slot from which the foaming resin is extruded in the form of a sheet 72. Guided by the guide rolls 66, 67 and 68 and 66', 67' and 68', the sheet which has on its inner surface a layer of projections 17a, 17b is passed over to the pressing rolls 69 and 69' and the opposite sides 15a and 15b of the sheet are now caused to pass between the pressing rolls. At this instant, the sheet 72 of fused foaming resin is supplied inbetween the opposite sides 15a and 15b so that the fused foaming resin is sandwiched between the opposite sides 15a and 15b of the sheet and is gripped by the layers 17a and 17b of the linear projections. The resultant sheet shown by reference numeral 71 is then drawn by drawing rolls 73 and 73'. In order to enable the opposite sides 15a and 15b of the sheet to more closely receive the intermediate layer of the foaming resin, it may be preferable to have suitable heating means 74 and 74' positioned adjacent the elongated slot (not numbered) of the die 70 whereby the formed sheet is internally heated before receiving the foaming resin is supplied thereto.

Examples of the thus formed multi-ply board are shown in (A) and (B) of FIG. 19 in their cross sections.

FIG. 20 illustrates in plan views, examples of the patterns of the partition walls to be sandwiched by the external layers resulting from the opposite sides 15a and 15b, wherein the example shown in (A) is produced where the mold structure is rotated continuously and the Example B is produced where the mold structure is held stationary as in the conventional practice.

The features of the method and apparatus according to the present invention will be more apparently understood by perusal of the following examples.

EXAMPLE 1

An extruder machine having a feeding screw of 90 mm. diameter and a mold structure with an annular extruding slot of 800 mm. outside diameter and 0.3 mm. width was used to extrude a continuous tubing of a high-density polyethylene in a fused state. A plurality of substantially rectangular, equidistantly spaced parallel serrations were formed on the outer peripheral wall of the inner die of the mold structure, the serrations being spaced at 6 mm. from each other and raised about 4 mm. from the bottoms. The tubing extruded from the annular slot was fed downwardly from the mold structure which was rotated as the tubing lowered therefrom and at the same time compressed air was blown into the tubing which, as a consequence, was forced against the inner wall surface of a hollow, open ended guide member configured as circular in cross section at its upper portion and flattened toward the lower portion thereof. The tubing, initially in a circular form in cross section, was thus deformed into a flat sheet of thermoplastic material in a fused state. As a result of such deformation, the linear projections formed on the facing inner surfaces of the tubing, which projections were deviated sidewardly from the longitudinal direction as the tubing was downwardly fed and rotated, were fused together to form a plurality of partition walls which were sandwiched by external layers. The thus formed flat sheet made up of three layers was then passed between a pair of opposite pressing rolls which were spaced at about 3 mm. from each other and was thereafter guided into a cooling device so as to be colled and set. The resultant multi-ply board was drawn by means of feeding rolls, which multi-ply board was about 3 mm. thick and 1000 mm. wide and having an isotropic mechanical resistance to bending stresses in different directions.

EXAMPLE 2

An extruder machine having a feeding screw of 90 mm. outside diameter and a mold structure with an outer annular slot of 800 mm. outside diameter and an inner annular slot of 740 mm. outside diameter, the width of each of the outer and inner slots being 0.3 mm. A plurality of serrations spaced 6 mm. from each other and raised about 4 mm. from the bottoms were formed on the inner wall surface defining the outer slot. Outer and inner concentric tubings of high-density polyethylene were extruded from the outer and inner annular slots, respectively, of the mold structure and were fed downwardly from the mold structure. A plurality of linear projections were formed on the inner surface of the outer tubing. Compressed air was blown into the inner tubing and inbetween the outer surface of the inner tubing and the inner surface of the outer tubing concurrently until the two tubings were expanded to predetermined diameters. In so doing, the mold structure was rotated at a predetermined speed so that the linear projections which were formed on the inner surface of the outer tubing were deviated from the longitudinal direction as the tubings were fed downwardly. The two tubings were guided in contact with a guide member which was configured as circular at its upper portion and flattened toward its lower portion whereby the two tubings were fused together into an integral, substantially flat sheet. The resultant sheet of thermoplastic material was passed between a pair of pressing rolls which were spaced about 5 mm. from each other and was thereafter cooled and set.

The multi-ply board obtained in this manner was made up of two structural layers each comprising outer and inner layers and an intermediate layer of parallel spaced partition walls. The partition walls formed in the two structural layers were in crossing relationship with each other.

EXAMPLE 3

An extruder machine having a feeding screw of 90 mm. diameter and a mold structure with an annular extruding slot of 800 mm. outside diameter and 0.3 mm. width was used to extrude a tubing of a high-density polyethylene. Serrations which were spaced about 6 mm. from each other and raised about 4 mm. from the bottoms were formed on the inner surface of the die defining the annular slot. A plurality of linear projections were thus formed on the inner surface of the tubing extruded from the annular slot. The mold structure was rotated at a selected speed so that the linear projections were deviated from the longitudinal direction as the tubing was fed downwardly. The tubing was then cut in the longitudinal direction into two halves facing each other. The two halves or sheets were heated internally and a sheet of fused foaming resin which was capable of foaming about thirty times was introduced inbetween the two sheets. The sheet of the fused foaming resin was extruded from an elongated slot of about 0.1 mm. width. The resultant integral sheet was passed between a pair of pressing rolls which were spaced about 4 mm. from each other and was then cooled and set. The resultant multi-ply board was made up of a pair of spaced external layers each having formed on its inner surface a plurality of parallel partition walls and an intermediate layer of the foaming material. The partition walls of the external layers were in crossing relationship with each other.

EXAMPLE 4

A tubing of polyvinyl chloride was extruded in the same manner as in Example 3 and the tubing was fed downwardly with the mold structure held stationary. The tubing was cut into two sheets and the resultant sheets were heated internally to about 100° C. A sheet of polyvinyl chloride which was capable of foaming about twenty five times and which was extruded from a slot of about 0.1 mm. width was supplied inbetween the two sheets so that an integral sheet made up of three layers was obtained. The thus formed integral sheet was about 3 mm. thick and was made up of two external layers each having parallel, straight partition walls and an intermediate layer of the foaming resin.

What is claimed is:

1. A method of manufacturing a multi-ply board of thermoplastic material, comprising the steps of extruding a continuous tubing of fused thermoplastic material and concurrently forming a plurality of spaced parallel ribs of said material over its inner peripheral surface, said ribs extending substantially in the direction of advance of the extruded tubing, blowing a gas under pressure into the tubing to expand the tubing to a predetermined diameter, at least partially twisting said tubing transversely to said direction of advancement of the tubing concurrently as the tubing is expanded to cause said ribs to slant with respect to said direction of advancement, collapsing the fully expanded tubing in a particular diametrical direction to cause two sets of opposed ribs of opposite semitubular portions of the tubing to approach each other, heating the tube from the interior thereof to cause said ribs at the tops thereof to reach a fusing temperature before the tops of the ribs contact one another, pressing the opposite portions of the resultant sheeting together before said ribs are cooled and set to effect fusing of said two sets of ribs together at the intersections of the tops of the two sets of ribs and thereafter positively cooling said opposite portions from the exterior thereof.

2. A method as claimed in claim 1, in which said tubing is twisted continuously in a fixed direction.

3. A method as claimed in claim 1, in which said tubing is twisted alternately in opposite directions.

4. A method as claimed in claim 1, in which said fully expanded tubing is longitudinally slit before said semitubular portions are caused to approach each other.

5. A method as claimed in claim 4, further comprising the steps of spreading out said semitubular portions with their ribbed surfaces in a facing relation, before the semitubular portions are caused to approach each other, and feeding a continuous web of a fused foaming thermoplastic material between said semitubular portions approaching each other to cause said two sets of ribs to be secured to said web.

References Cited
UNITED STATES PATENTS

| | | | |
|---|---|---|---|
| 3,589,958 | 6/1971 | Schrenk | 264—95 |
| 3,342,657 | 9/1967 | Dyer | 156—229 |
| 3,557,268 | 1/1971 | Beretta et al. | 264—167 |
| 3,193,604 | 7/1965 | Mercer | 264—146 |
| 3,467,565 | 9/1969 | Utz | 156—244 |
| 3,561,048 | 2/1971 | Ernest | 264—47 |
| 3,233,576 | 2/1966 | Voelker | 264—47 |
| 2,750,631 | 6/1956 | Johnson | 264—177 R |
| 3,019,483 | 2/1962 | Schultheiss | 264—167 |

ROBERT F. WHITE, Primary Examiner

J. R. THURLOW, Assistant Examiner

U.S. Cl. X.R.

156—156, 244; 264—47, 95, 146, 167, 173